United States Patent

[11] 3,564,136

[72] Inventors Alexander S. Gilmour, Jr. Williamsville;
Thomas L. Robinson, Sr., East Aurora, N.Y.

[21] Appl. No. 735,856
[22] Filed June 10, 1968
[45] Patented Feb. 16, 1971
[73] Assignee Cornell Aeronautical Laboratory, Inc. Buffalo, N.Y.

[54] ELECTROLUMINESCENT TELEVISION DISPLAY PANEL
9 Claims, 2 Drawing Figs.

[52] U.S. Cl. .......... 178/7.3
[51] Int. Cl. .......... H04n 5/44, H04n 5/70
[50] Field of Search .......... 178/7.3 (D), 7.5 (D), 5.4 (EL); 315/169; 313/(Inquired); 250/(Inquired)

[56] References Cited

UNITED STATES PATENTS

| | | | |
|---|---|---|---|
| 2,858,363 | 10/1958 | Kazan .......... | 178/5.4(EL) |
| 2,928,980 | 3/1960 | Williams .......... | 178/5.4(EL) |
| 3,263,028 | 7/1966 | Shanafelt et al. .......... | 178/7.3(D) |
| 3,388,255 | 6/1968 | May .......... | 178/7.3(D) |

*Primary Examiner*—Richard Murray
*Attorney*—Allen J. Jaffe

ABSTRACT: An electroluminescent display panel having trigger cells optically aligned with photoconductors that are connected in series with display electroluminescent cells. A scanner controls the application of a video signal to the trigger cells, which in turn actuate the display cells. Feedback can be provided to increase the decay time of the photoconductors.

PATENTED FEB 16 1971 3,564,136

INVENTOR
ALEXANDER S. GILMOUR JR.
THOMAS L. ROBINSON SR.

BY [signature]

ATTORNEY

ELECTROLUMINESCENT TELEVISION DISPLAY PANEL

BACKGROUND OF THE INVENTION

The present invention relates to information displays and more particularly, to a solid state television display panel.

Conventional solid state flat screen television displays generally comprise an electroluminescent material sandwiched between a plurality of horizontal or row conductors and a plurality of vertical or column conductors. The picture elements of the display arranged, defined by the row $R_c$olumn $R_p$oints, $R_3$ ....$R_w$hich glows in response to a video signal applied thereacross.

A source of primary difficulty with most conventional solid state displays has been the inability to achieve brightness levels suitable for satisfactory viewing. This is because the short activation time of each picture element severely limits the average light output of the electroluminescent phosphors. For example, with a frame rate of 30 pictures per second and a resolution density of about $25 \times 10^4$, the length of time in each frame during which video information is supplied to the picture elements is approximately $0.13 \times 10^{-6}$ seconds. As should be apparent, this is much too short a time for the average brightness of the phosphor to persist for satisfactory viewing.

SUMMARY OF THE INVENTION

The foregoing and other difficulties are overcome by the apparatus constructed in accordance with the teachings of the present invention which contemplates the provision of a solid state electroluminescent display that is capable of producing television images that are of satisfactory brightness and resolution.

According to the present invention there is provided electroluminescent picture display elements or cells, the persistence of which are controlled by photoconductors, which, in turn are actuated by a plurality of trigger electroluminescent cells that are responsive to the applied video signals. In this manner, the photoconductors function as latching elements to control the voltage applied to the picture display cells in response to pulses of light from the trigger cells. The time constant between the photoconductors and the display cells is chosen such that the change in photoconductor resistance, induced by the triggering light pulse, will persist for a frame cycle. Thus, whereas the average intensity of the triggering pulse is too low for these pulses of light to be viewed (being on the order of $10^{-8}$ seconds), the display cells by means of the latching photoconductors function as a "memory" to preserve and amplify the trigger pulses long enough and at a level suitable for viewing.

According to one aspect of the present invention, the display electroluminescent cells and the photoconductors are coplanar and mounted above the trigger electroluminescent cells to form two separate panels.

According to a second aspect of the invention, the display cells are radiation coupled to the photoconductors to extend the decay time thereof.

BRIEF DESCRIPTION OF THE DRAWINGS

For a more fuller understanding of the invention, reference may be had to the following detailed description of the same taken in conjunction with the accompanying drawings wherein.

DESCRIPTION OF THE PREFERRED EMBODIMENTS

Figure 1:
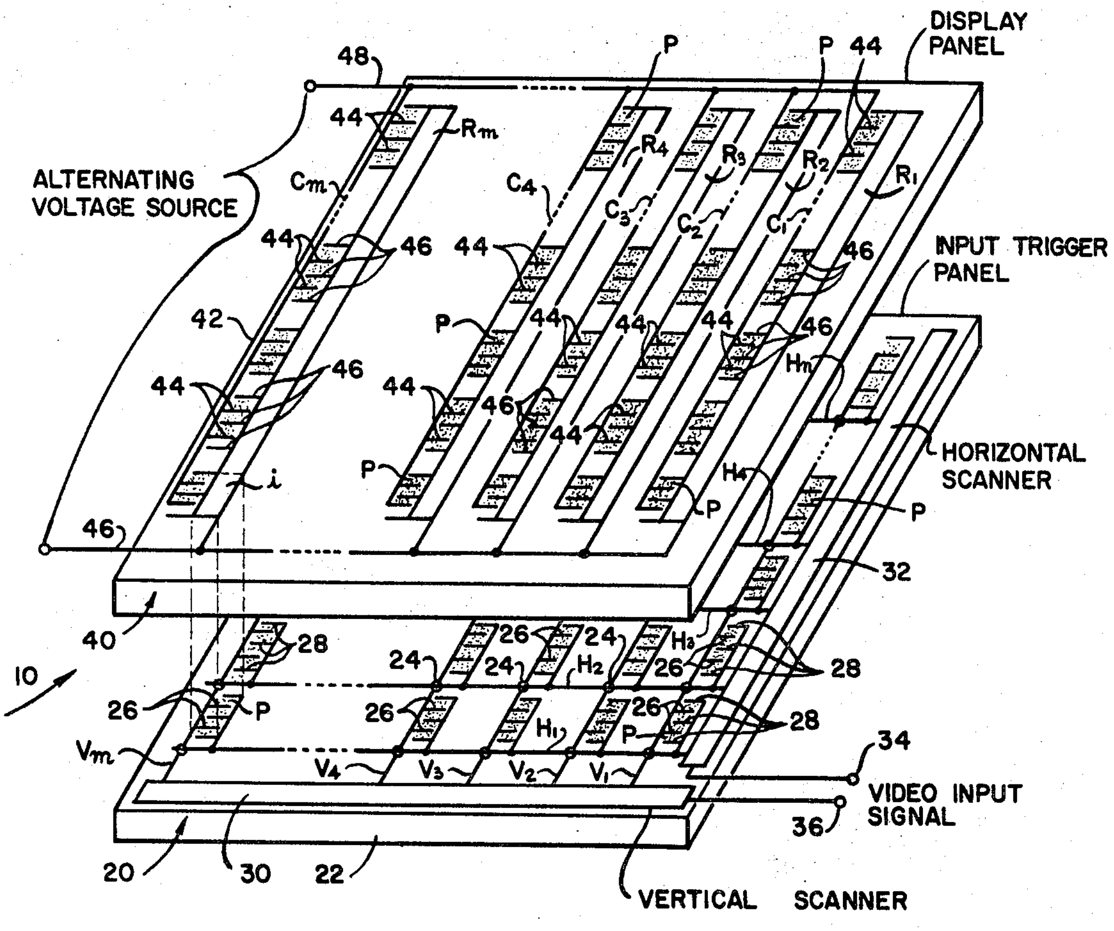
FIG. 1 is a partially exploded pictorial of one embodiment of the invention.

Referring now to the drawings and, more particularly to FIG. 1, the television display according to one aspect of the invention is depicted generally at 10, and comprises an input trigger panel assembly 20 and a picture display panel assembly 40.

The input trigger panel assembly 20 includes a generally rectangular thin substrate 22 fabricated from any suitable dielectric material such as glass, mica, ceramic or plastic.

A plurality of horizontal conductors $H_1$, $H_2$, $H_3$ ....$H_n$ are located on substrate 22. Similarly, a plurality of vertical conductors $V_1$, $V_2$, $V_3$ ....$V_m$ are arranged at right angles to the horizontal conductors on substrate 22. As shown, a suitable dielectric pad 24 is provided at each crossover point between the horizontal and vertical conductors to electrically insulate one from the other.

Each vertical conductor $V_1$, $V_2$, $V_3$ ....$V_m$ has $n$ sets of electrode fingers 26 that interdigitally project between opposed sets of coplanar fingers 28 that emanate from the horizontal conductors. Electroluminescent phosphor is located between and substantially coplanar with the fingers 26 and 28, as depicted schematically at $P$; thereby defining $n$ times $m$ discrete electroluminescent cells.

The vertical conductors $V_1$, $V_2$, $V_3$ ....$V_m$ are electrically connected to a horizontally arranged scanner depicted schematically at 30, whereas horizontal conductors $H_1$, $H_2$, $H_3$ ....$H_n$ are electrically connected to a vertically mounted scanner depicted schematically at 32. Scanners 30 and 32 could comprise any suitable solid state switching devices of the type wherein a video information signal across terminals 34 and 36 is caused to be sequentially applied between selected vertical and horizontal conductors to energize the particular electroluminescent cell at the conductor intersections. A suitable solid state scanner for this purpose is disclosed in Ser. No. 698,550 filed Jan. 17, 1968 and assigned to the assignees of the present application.

The video display panel 40 comprises a generally rectangular substrate 42 fabricated of a suitable dielectric radiation transmissive material such as glass or the like. Substrate 42 is adapted to be mounted in overlaying contacting relation to substrate 22 and contains a plurality of vertically arranged, parallel photoconductor strips $R_1$, $R_2$, $R_3$ ....$R_m$. Each strip has portions located directly above corresponding portions of the electroluminescent cells of the input panel 22 to be optically aligned therewith such that radiation from the cells will impinge upon the strips. For example, the radiation from the cell corresponding to the intersection of $H$and $V_m$ illuminates the projected area "i" of the strip $R_m$. These photoconductors are photosensitive elements of the type having a normally high electrical impedance that reduces to near zero when subject to radiation. Any number of suitable materials can be chosen, as, for example, cadmium sulfide and cadmium selenide or, for less sensitive response, silicon and germanium.

Associated with and spaced from each photoconductor $R_1$, $R_2$, $R_3$ ....$R_m$ and parallel and substantially coplanar therewith a plurality of conductors $C_1$, $C_2$, $C_3$ ....$C_m$. Each conductor $C$ has a plurality of electrode fingers 44 projecting perpendicularly therefrom toward the photoconductor associated therewith and between corresponding electrode fingers 46 emanating from the photoconductors to form a coplanar interdigital set of electrodes. Electroluminescent phosphor $P$ is located between and substantially coplanar with the fingers 44 and 46 thereby defining a plurality of picture display cells or elements that are series-connected with portions of the photoconductors associated therewith. The cells are adapted to be excited by a source of alternating voltage applied across terminals 46 and 48 connected respectively to the photoconductor strips $R$ and the conductors $C$.

In the operation of the device described in FIG. 1, an excitation voltage is applied across terminals 46 and 48 of the display panel and is of such frequency and amplitude that the impedance of each electroluminescent cell (defined by fingers 44 and 46 and the phosphor $P$ therebetween) matches that of the photoconductor associated therewith in the absence of a trigger pulse from panel 20. Under these conditions, with no trigger pulses, no light will be emitted by the display panel electroluminescent cells since they are below the operating threshold level. When the horizontal and vertical scanners of trigger panel 20 allows the video input signal to be applied across a selected horizontal and vertical conductor such that the trigger electroluminescent cell adjacent the intersection thereof is caused to emit radiation to the portion of the photoconductor *R* optically aligned therewith, this photoconductor's resistance is lowered. Because of the reduced series resistance, the voltage across the adjacent display cell is thus raised above the threshold necessary for it to emit light. The time constant is chosen such that the change in photoconductor resistance, induced by the triggering light pulse from panel 20, will persist for a frame cycle, which for conventional viewing is 1/30 of a second.

At the end of one frame cycle, another video trigger pulse (perhaps of a different amplitude and width) again triggers the selected electroluminescent picture display cell. This action is repeated at the rate of 30 times per second. Similar action occurs for every other discrete picture element distributed over the total area of the display panel, resulting in a reproduction of a complete image.

From the foregoing, it should be apparent that although the time constant of the display panel photoconductor-electroluminescent cell combination is short enough to respond to the submicrosecond video pulses from the trigger panel, this photoconductor electroluminescent cell combination is capable of storing the triggered radiation in the form of a visible emission just long enough to last for the length of one frame time (1/30 of a second).

Since the decay of highly sensitive photoconductors such as cadmium sulfide and cadmium selenide is a function of the intensity of the triggering radiation, which for the trigger panel is very low, it has been found that the decay times of the photoconductors *R* are compatible with the frame time requirements of conventional television.

Less sensitive, fast response photoconductors such as lead sulfide and thallus sulfide can be utilized also. However, in this case, the decay curve is much too short for holding the display cells on once it has been triggered by the video pulse. Therefore, it is necessary to lengthen the decay curve; that is, the photoconductor must be held in its low resistance state for the duration of a frame cycle equal to 1/30 of a second. This delay can be built into the display panel by simply overlapping a portion of the photoconductor *R* with a part of the electroluminescent display cell 44, *P*, 46. The The display panel would now have radiation feedback, the degree of which, can be adjusted by the proper mixture of electroluminescent and photoluminescent phosphors in the electroluminescent cell, as is known to those skilled in the art.

Figure 2:
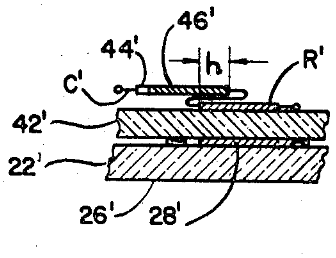
FIG. 2 is a fragmentary sectional view of a second embodiment.

This modification is illustrated in FIG. 2, wherein like numerals plus primes refer to like parts of the FIG. 1 embodiment. In this embodiment, the display panel electroluminescent cell defined by electrodes 44' and 46' is located in a plane slightly above the plane of the photoconductors *R'* and overlaps them by an amount *h*. In this manner, a portion of the radiation from the display cell is fed back to the photoconductor to increase the decay time thereof; the amount of the overlap *h* determining the length of decay.

The processes and techniques used for fabricating both the video input panel 22, and the picture display panel 42 can be nearly identical. The electrode fabrication process can be selected from one or more of the following: electroplating, etching, vacuum deposition, letterpress printing using a conductive formulation, and by the chemical reduction of conductive metal films. Each of these processes would produce its own unique effect on the electrical properties (primarily the resistance and capacitance) of the display. Thus, the selection of one particular process will be based primarily on the electrical behavior of the display. The horizontal and vertical conductors can be deposited by vacuum deposition techniques; the insulating crossover pads 24 can be deposited by silk screening technique or by photomechanical means.

The electroluminescent phosphor can be deposited by one of several techniques, depending on the phosphor system which best fits the requirements of the panel. For the sake of discussion, the paste phosphor system will be described.

A thin coat of electroluminescent paste phosphor mix can be applied by means of a silk screen, a doctor blade or by spraying over the entire electrode array. After the phosphor has had time to "set", a protective coat of transparent insulating material could be applied to protect against dirt, gross humidity and handling abuses.

The video input trigger could then be connected to the scanning strips by means of micro cable techniques. In mass production, the entire video trigger panel minus the scanning strips could be "printed" on a conventional offset proof press since the component materials are merely a conducting "ink" and a "phosphor" pigmented emulsion on a printable substrate.

Although the invention has been described by way of reference to preferred embodiments, changes therein will occur to those skilled in the art. Therefore, it is intended that the invention is to be limited only by the scope of the appended claims.

We claim:

1. An electroluminescent display apparatus, comprising;
a. a plurality of display electroluminescent cells comprising substantially coplanar electrodes with electroluminescent phosphor therebetween,
b. photosensitive means series-connected to each one of said display cells,
c. a plurality of substantially coplanar trigger electroluminescent cells comprising spaced coplanar electrodes with electroluminescent phosphor therebetween, each trigger cell optically aligned with a separate one of said photosensitive means, and
c. means operative to select predetermined ones of said trigger cells to emit radiation.

2. The apparatus according to claim 1, wherein;
e. said plurality of trigger electroluminescent cells each have a terminal connected to a horizontal conductor and a terminal connected to a vertical conductor, and
f. said means operative comprises scanners connected to each of said horizontal and vertical conductors for allowing an input video signal to be sequentially impressed across selected horizontal and vertical conductors.

3. The apparatus according to claim 2, wherein;
g. said photosensitive means are substantially coplanar with each other and with each of said display cells.

4. The apparatus according to claim 2, wherein;
g. each of said display cells have a portion thereof that is optically aligned with a portion of the photosensitive means associated therewith.

5. The apparatus according to claim 1, wherein;
e. said photosensitive means are substantially coplanar with each other and with each of said display cells.

6. The apparatus according to claim 1, wherein;
e. each of said display cells have a portion thereof that is optically aligned with a portion of the photosensitive means associated therewith.

7. An electroluminescent display apparatus, comprising;
a. a plurality of spaced parallel horizontal conductors,
b. a plurality of spaced parallel vertical conductors arranged substantially at right angles to said horizontal conductors and in intersecting relationship therewith,
c. a plurality of trigger electroluminescent cells, each connected across one of said horizontal conductors and one of said vertical conductors in the vicinity of the intersection thereof, said cells comprising spaced coplanar electrodes with electroluminescent phosphor therebetween,
d. a plurality of photosensitive strips each having separate portions that are optically aligned with separate ones of said trigger electroluminescent cells, and
e. a plurality of display electroluminescent cells each series-connected to said separate portions of said photosensitive strips, said display cells comprising substantially coplanar electrodes with electroluminescent phosphor therebetween.

8. The apparatus according to claim 7, further comprising,
f. scanning means connected to each of said horizontal and vertical conductors.

9. The apparatus according to claim 8, wherein;

g. a portion of each of said display cells is optically aligned with an area of said portion of said photosensitive element associated therewith.

UNITED STATES PATENT OFFICE
CERTIFICATE OF CORRECTION

Patent No. 3,564,136 Dated February 16, 1971

Inventor(s) Alexander S. Gilmour, Jr., et al

It is certified that error appears in the above-identified patent and that said Letters Patent are hereby corrected as shown below:

Column 1, lines 11 and 12, "arranged, defined by the row $R_c$ olum $R_p$ oints, $R_3 \ldots R_w$ hich" should be deleted and --- are defined by the rc and column intersection points, the electroluminescent material between which --- should be inserted.

Claim 1, line 12 "(c)" should be --- (d) ---.

Signed and sealed this 29th day of June 1971.

(SEAL)
Attest:

EDWARD M.FLETCHER,JR.
Attesting Officer

WILLIAM E. SCHUYLER, JR
Commissioner of Patents